United States Patent
Kupsh et al.

(10) Patent No.: US 7,353,035 B1
(45) Date of Patent: *Apr. 1, 2008

(54) METHOD AND SYSTEM FOR SELECTIVE DISPLAY OF THE ORIGINATION ADDRESS AND THE CALL-BACK NUMBER OF THE ORIGINATOR OF AN ELECTRONIC MESSAGE

(75) Inventors: Jerry Kupsh, Concord, CA (US); Syed Haider, Walnut Creek, CA (US)

(73) Assignee: Cellco Partnership, Bedminster, NJ (US)

( * ) Notice: Subject to any disclaimer, the term of this patent is extended or adjusted under 35 U.S.C. 154(b) by 915 days.

This patent is subject to a terminal disclaimer.

(21) Appl. No.: 10/198,649

(22) Filed: Jul. 17, 2002

(51) Int. Cl.
*H04Q 7/20* (2006.01)

(52) U.S. Cl. ............... 455/466; 370/352; 370/363; 379/142.02; 455/413; 455/566

(58) Field of Classification Search ........... 455/410, 455/411, 412.1, 412.2, 415, 466, 566, 433; 379/88.13, 88.19, 88.21, 93.01, 207.15, 142.02, 379/210.03; 370/352, 363
See application file for complete search history.

(56) References Cited

U.S. PATENT DOCUMENTS

| | | | |
|---|---|---|---|
| 5,533,106 A * | 7/1996 | Blumhardt | 379/142.02 |
| 5,577,102 A * | 11/1996 | Koivunen | 455/433 |
| 5,678,179 A * | 10/1997 | Turcotte et al. | 455/466 |
| 6,553,110 B1 * | 4/2003 | Peng | 379/210.03 |
| 6,788,673 B1 * | 9/2004 | Koskinen | 370/352 |
| 2004/0106418 A1 * | 6/2004 | Cini et al. | 455/466 |

FOREIGN PATENT DOCUMENTS

WO    WO 00/76231 A1 * 12/2000

OTHER PUBLICATIONS

TIA/EIA Standard—637-B-2002, "Short Message Services for Wideband Spread Spectrum Systems", Jan. 2002.

* cited by examiner

*Primary Examiner*—Gerald Gauthier
(74) *Attorney, Agent, or Firm*—McDermott Will & Emery LLP

(57) ABSTRACT

A method and system for selectively displaying an origination address of a mobile message, e.g., an SMS message, includes the steps of: (1) determining that a mobile message includes an origination address that should not be displayed on a recipient device; and (2) including data in the mobile message to cause the origination address not to be displayed on the recipient device. The origination address which is selectively prevented from being displayed is one which is not provided by the prime, i.e., true originating sender of the mobile message. A call-back number may be similarly selectively displayed. The system and method provide a way to address recipient confusion that may arise from the display of origination information that is meaningless or otherwise incomprehensible to message recipients.

20 Claims, 3 Drawing Sheets

METHOD AND SYSTEM FOR SELECTIVE DISPLAY OF THE ORIGINATION ADDRESS AND THE CALL-BACK NUMBER OF THE ORIGINATOR OF AN ELECTRONIC MESSAGE

FIELD OF USE

The present invention relates to mobile messaging. More particularly, the present invention relates to a method and system for selectively displaying the origination address which identifies the originator of an electronic mobile message and, optionally, a call-back number for the originator.

BACKGROUND OF THE INVENTION

Normally in mobile messaging applications, such as those that utilize the short messaging service ("SMS") as defined for Code Division Multiple Access ("CDMA") systems in TIA/EIA 637-B, which is hereby incorporated herein by reference in its entirety, the mobile device receiving a mobile message will also receive and display an identification of the device or individual who sent the message. This identification is known as the origination address and is commonly referred to as the "from" address. In CDMA-based systems operating under TIA/EIA 637-B, the origination address is derived from the Origination Address parameter defined in sec. 3.4.3.3 of TIA/EIA 637-B.

In addition to receiving and displaying the origination address, a receiving SMS-capable wireless device, e.g., an SMS-capable wireless telephone, may also be programmed to allow the display of an identifier or address to which a reply to the received mobile message may be sent. This identifier is known as the call-back number and is commonly referred to as the "reply" address. In the case of CDMA-based systems, the call-back number is derived from the Call-back Number subparameter defined in sec. 4.5.15 of TIA/EIA 637-B.

The origination address and the call-back number may be in the form of a ten digit number (e.g., when the sending or reply device is a wireless telephone) or in the form of an e-mail address (e.g., when the sending or reply device is a networked or web-enabled device) as described in TIA/EIA-637-B, secs. 3.4.3.3 and 4.5.15.

Oftentimes, the displayed origination address and call-back number are meaningless to a message recipient. For example, in the case of an on-line internet-based mobile messaging service which allows internet-based users to send and receive messages to and from SMS-based wireless devices and also allows the internet-based user to track the delivery status of the SMS-message, such a system will often include an origination address and a call-back number that are meaningless to the recipient in the sense that they do not correspond to the true origination address and call back number of the sender, but rather to the messaging service.

An example of an internet-based mobile messaging service is illustrated in FIG. 1. The mobile messaging application of FIG. 1 allows any individual to send an SMS message to a subscriber's mobile device 104 via an internet web page displayed on terminal 102.

First, the internet web page requests that the user enter the message to be sent to mobile device 104, the mobile number or other identifying information of the receiving wireless device 104, and, optionally, a reply address, such as an e-mail address or mobile telephone number of the user, to which a reply to the message may be delivered.

Once this information has been entered and the user has pressed a "submit" or other equivalent button, the message is directed from internet terminal 102 to a wireless Internet gateway 106. Wireless Internet gateway 106 stores the identity of the originating terminal device, e.g., the IP address of terminal 102, and the reply e-mail address or telephone number of the user, along with a corresponding unique random identification number.

Using the Short Message Point to Point Protocol ("SMPP") or other appropriate protocol, wireless Internet gateway 106 then sends the message to SMS network 107 via Short Message Service Center ("SMSC") 108. The origination address and call-back number of the message that is sent to SMS network 107 is derived from the unique identifier assigned to the message at wireless Internet gateway 106 and from the Internet address of wireless Internet Gateway 106. Thus, although important to the proper operation of the service, the origination address and call-back number will appear meaningless to the wireless subscriber 104 when the message is received at receiving wireless device 104 in the sense that they are not the true origination address and callback number. As an example, the origination address and call-back number may appear as "5D79325@v.w" where "5D79325" corresponds to the unique identifier assigned to the message by wireless Internet gateway 106 and "v.w." is the Internet domain name of wireless Internet gateway 106.

SUMMARY OF THE INVENTION

The present invention includes a method and system that provides for selective display of the origination address and the call-back number of a mobile message which may otherwise be meaningless or confusing to a message recipient.

The method includes the steps of: (1) determining that a mobile message includes an origination address that should not be displayed on a recipient device; and (2) including data in the mobile message to cause the origination address not to be displayed on the recipient device. The origination address is not provided by the prime, i.e., the true, originator of the mobile message. A call-back number may be similarly selectively displayed.

A wireless device, such as a wireless phone capable of mobile messaging, and designed in accordance with the present invention, includes: (1) means for receiving a mobile message; (2) means for storing an origination address associated with the received mobile message; (3) means for determining if the origination address should be displayed to a user of the wireless device; and (4) means for displaying the origination address to the user of the wireless device if the origination address determining means determines that the origination address should be displayed. The wireless device may further include: (5) means for storing a reply address associated with the received mobile message; (6) means for determining if the reply address should be displayed; and (7) means for displaying the reply address if the determining means determines that the origination address should be displayed.

BRIEF DESCRIPTION OF THE DRAWINGS

The foregoing and other features of the present invention will be more readily apparent from the claims and the following detailed description and drawings of an illustrative embodiment of the invention in which:

DETAILED DESCRIPTION OF AN EXEMPLARY EMBODIMENT OF THE INVENTION

The exemplary embodiment of the present invention described below utilizes a known, but generally undefined, parameter of the TIA/EIA-637-B SMS specification-defined protocol to selectively inform a recipient wireless device whether or not an origination address and/or call-back number of a received mobile message are to be displayed. Although the embodiment of the invention described herein refers to a specific parameter of the above-referenced SMS specification, it is understood that any unused parameter of the SMS specification may be utilized to accomplish the selective display of the origination address and/or the call-back number.

Moreover, it is further understood that the present invention is not limited to the specific version of the described SMS specification, but is also applicable to other versions of the SMS specification as well as to any other mobile messaging system which identifies and displays the origination address and/or call-back number or similar identifiers and where selective display of an identifier is required or desirable. Additionally, although the embodiment described herein relates to a wireless network operating under the standards of Code Division Multiple Access ("CDMA"), it is understood that the present invention is not limited to CDMA networks, but rather the present invention may be adapted to operate in any network, e.g. TDMA, GRPS, etc., utilizing appropriate mobile messaging standard.

Figure 2:
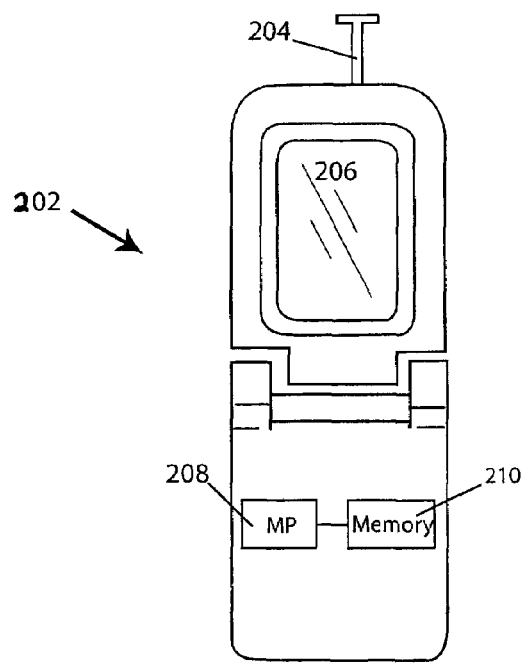
FIG. 2 illustrates a wireless device capable of sending and receiving mobile messages.

FIG. 2 illustrates an exemplary design of a wireless phone 202 programmed in accordance with the present invention. Wireless phone 202 includes an antenna 204 for receiving and transmitting SMS messages in the form of electromagnetic signals, a display 206 for displaying the received SMS messages, a microprocessor 208 for controlling the operation of wireless phone 202 and a memory storage area 210 for storing received SMS messages and for storing programming code utilized by microprocessor 208 to control the operation of wireless phone 202. It is understood that memory storage area 210 and microprocessor 208 may be a single unitary device, such as known microprocessor devices that include resident memory. In accordance with the present invention, mobile phone 202 may be any of the known mobile phones capable of receiving or transmitting SMS messages, such as those manufactured by Nokia®, Ericcson®, Motorola® and Samsung®.

In accordance with the present example, wireless phone 202 operates in a CDMA-based wireless network and is capable of receiving and sending SMS messages in accordance with TIA/EIA-637-B. Wireless phone 202 include software code in memory storage area 210 which, in cooperation with microprocessor 208, reads and creates packets of data which include information bits, as defined in TIA/EIA 637-B, to thereby provide wireless phone 202 with SMS messaging functionality.

TIA/EIA 637-B provides a set of bits called the Privacy Indicator subparameter which is defined in sec. 4.5.10 of the standard. TIA/EIA 637-B generally defines the use of these bits for "desired privacy level of the message." This subparameter is not presently utilized in wireless communication systems. In accordance with an exemplary embodiment of the present invention, wireless phone 202 is programmed to utilize the Privacy Indicator subparameter to provide selective display of the origination address and/or call-back number of a received SMS message as described below.

A person of ordinary skill in the art of programming mobile devices may accomplish the programming necessary to configure wireless phone 202 in accordance with the exemplary embodiment of the present invention. The programming of wireless phone 202 is preferably completed during the initial wireless phone manufacturing and programming process, i.e., before purchase of wireless phone 202 by a subscriber. Alternately, wireless phone 202 may be programmed using over the air programming ("OTAP") if wireless phone 202 is designed, programmed and manufactured with such capability.

Figure 3:
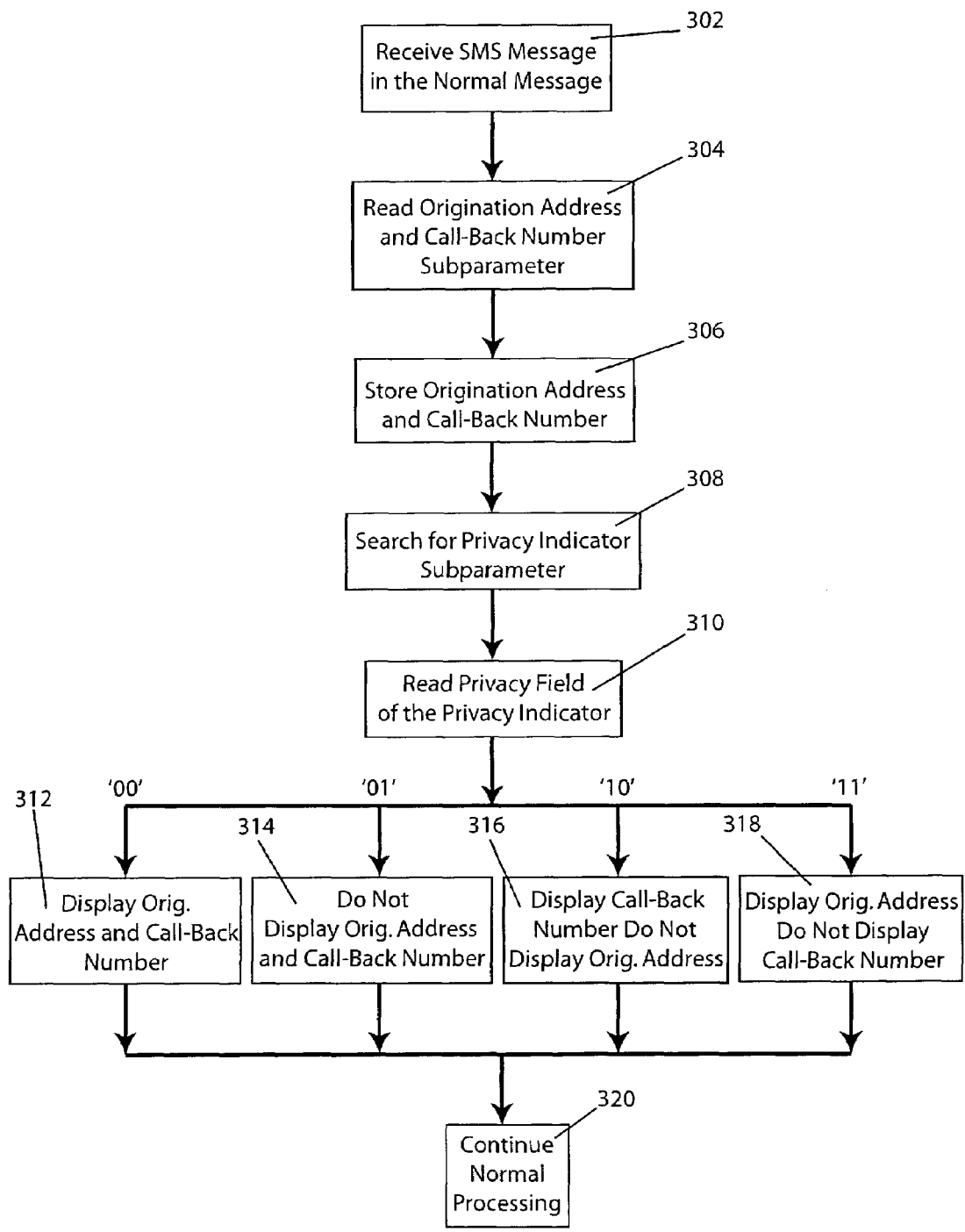
FIG. 3 illustrates an exemplary method of operation of a mobile phone receiving mobile messages.

FIG. 3 illustrates an exemplary process executed by mobile phone 202, whereby mobile phone 202 selectively determines whether the origination address and/or call-back number of a received message are to be displayed.

The process of FIG. 3 commences at step 302 where wireless phone 202 receives an SMS message in the normal manner.

At step 304, wireless phone 202 reads the Origination Address parameter as defined in TIA/EIA-637-B, sec. 3.4.3.3 of the received SMS message. Mobile phone 202 also reads the Call-Back Number subparameter as defined in TIA/EIA-637, secs. 4.5.15 of the received SMS message, if a call-back number is included with the message.

At step 306, wireless phone 202 stores the origination address and the call-back number in memory 210 as derived from the Origination Address parameter and Call-back Number subparameter, respectively, in step 304.

With continued reference to the process of FIG. 3, at step 308, wireless phone 202 searches for the Privacy Indicator subparameter that is included with the received SMS message.

Once the Privacy Indicator subparameter is found, mobile phone 202 then proceeds to step 310 and reads the PRIVACY field of the Privacy Indicator subparameter as defined in TIA/EIA-637-B, sec. 4.5.10. The PRIVACY field is a two bit value and, therefore, allows for the definition of four possible values assigned to the PRIVACY field.

With continued reference to the process of FIG. 3, if the PRIVACY field is '00', mobile phone 202 proceeds to step 312 and displays, or allows for the display of, the origination address and the call-back number on display 206.

If the PRIVACY field is '01', mobile phone 202 instead proceeds to step 314 and does not display, or allow display of, the origination address or the call-back number on display 206. The origination address and call-back number may nevertheless remain stored in memory 210 for use with other processes normally associated with message reception.

Additionally, the embodiment of the present invention described herein allows selective display of the origination address and call-back number individually. For example, if the PRIVACY flag is '10', then mobile phone 202 proceeds to step 316 and does not display, or allow display of the origination address but does allow displays of the call-back number.

Conversely, if the PRIVACY flag is '11', then mobile phone 202 proceeds to step 318 and displays, or allows display of, the origination address, but not the call-back number.

The exemplary process of FIG. 3 then proceeds to step 320 where normal processing of the received SMS message continues in accordance with TIA/EIA-637-B.

It is understood that in accordance with TIA/EIA-637-B, the Call-Back Number subparameter is optional and, therefore, if it not present in the SMS message received at step 302, then processing of the Call-Back subparameter as described in the process of FIG. 3 is not necessary. It is further understood that the steps of the process of FIG. 3 may occur at any point during the normal processing of the received SMS message. It is also understood that the steps of the process described in FIG. 3 need not proceed in the exact sequence shown, but rather, additional steps relating to reception, display and processing of SMS messages may be interspersed with the described steps as deemed appropriate by the programmer of mobile phone 202.

Various methods may be utilized to identify those SMS messages that include an origination address and call-back number that are meaningless or confusing to the recipient and which should therefore not be displayed.

Figure 1:
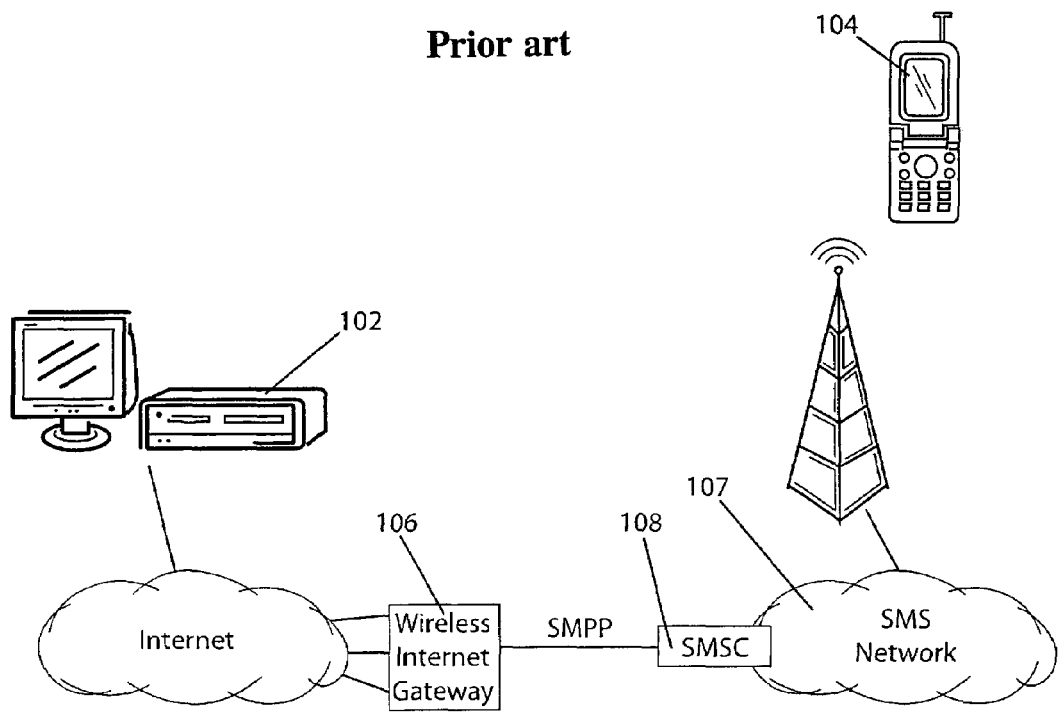
FIG. 1 illustrates a mobile messaging system which facilitates delivery of mobile messages.
Figure 4:
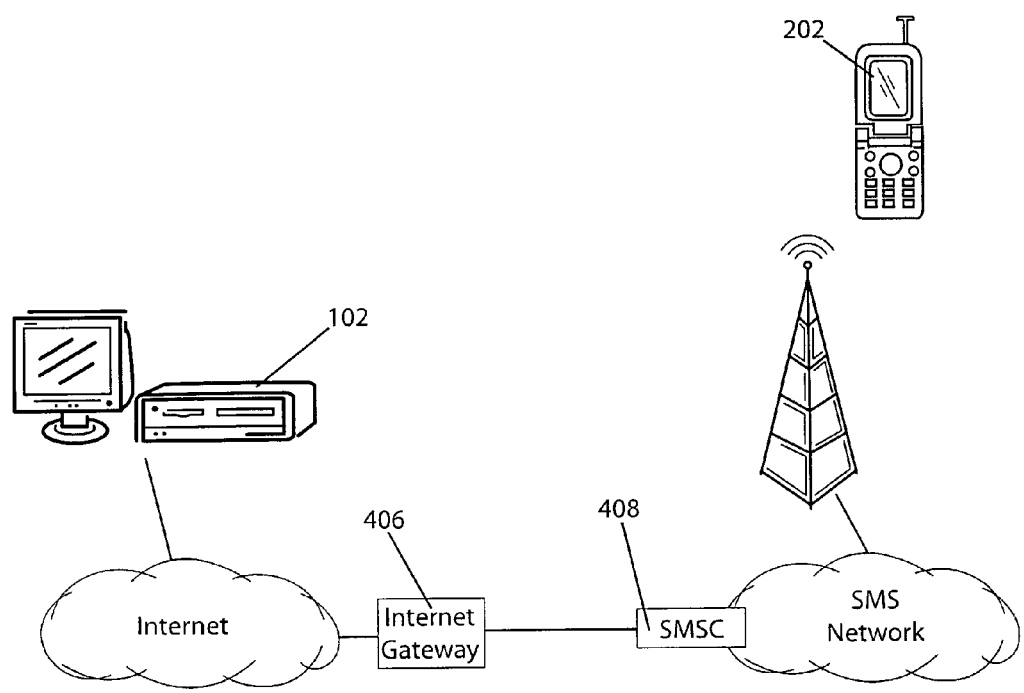
FIG. 4 illustrates an exemplary mobile messaging system to facilitate delivery of mobile messages in accordance with the present invention.

FIG. 4 illustrates a system designed in accordance with an embodiment of the present invention. The system of FIG. 4 is similar to that of FIG. 1, except that the system of FIG. 4 includes wireless phone 202 which is programmed to recognize the Origination Address parameter and Privacy Indicator subparameter and, optionally, the Call-back Number subparameter as described in FIGS. 2 and 3. The system of FIG. 4 further includes a wireless Internet gateway 406 and SMSC 408 which are programmed to create SMS messages with message-specific uniquely defined origination addresses and call-back numbers.

As an example, wireless Internet gateway 406, may be manually programmed to include a Privacy Indicator value of '01', or other appropriate value, by default to facilitate non-display of the origination address and call-back number. Continuing with this example, the Privacy Indicator is included in the SMPP packet containing the message which is sent from wireless Internet gateway 406 to SMSC 408. SMSC 408 is programmed to include the Privacy Indicator in the SMS message which is then sent to wireless phone 202. In this manner, any wireless phone receiving messages via wireless Internet gateway 106 will not display the actual origination address or the call-back number of the message.

As an alternate example, and with continued reference to FIG. 4, additional programming of wireless Internet gateway 406 is not necessary. Instead, SMSC 408 may be manually programmed to automatically add a Privacy Indicator with a value '01', or other desired value, to all messages arriving for delivery from certain sources for delivery via SMS network. Thus, SMSC 408 may be preprogrammed to identify all messages arriving for delivery from wireless Internet gateway 406 and include an appropriate Privacy Indicator of '01' to the messages.

In instances where the operator of the internet-based mobile messaging service desires to provide the recipient of the SMS message with some indication of the identity of the originator of the message, the text of the SMS message may be utilized to provide the identification. As an example, the web page presented to the user at terminal 104 may include a "Sender" entry field in which the user may enter his name. Wireless Internet gateway 406 then adds the user's name (as the name was entered in the "Sender" field) to the SMS message text defined by the User Data subparameter of TIA/EIA-637-B, sec. 4.5.2, and preferably precedes the name with the text "FROM:." Mobile phone 202 will then display the name of the user, e.g., "FROM: Bob Smith", at the beginning of the SMS message text. In this manner, the identity of the first, i.e., prime originator of the message is made known to the recipient.

Similarly, the call-back number or email address that is entered by the user at terminal 102 to identify where a reply may be sent may also be added to the text of the message. In this manner, the user can know the actual reply address from the message which is sent.

The above-described methods and embodiments of the present invention are exemplary and are not meant to limit the scope of the present invention which is defined solely by the claims which follow.

We claim:

1. A method for selectively displaying an origination address of a mobile message comprising the steps of:
   determining that a mobile message includes an origination address that is not to be displayed on a recipient device; and
   including data in the mobile message to cause the origination address not to be displayed on the recipient device, wherein the origination address is not provided by a prime originator of the mobile message and is derived from a unique identifier assigned to the message by a wireless internet gateway.

2. The method of claim 1, further including the step of:
   displaying, as part of the text of the mobile message, an identifier provided by the prime originator of the message, wherein the identifier identifies the prime originator of the message.

3. The method of claim 1, wherein the mobile message is a short messaging service message.

4. The method of claim 3, wherein the origination address is included in the Origination Address parameter of the short messaging service message.

5. The method of claim 3, wherein the data that causes the origination address not to be displayed includes the PRIVACY field of the Privacy Indicator subparameter.

6. The method of claim 1, wherein the determining step occurs at one of a wireless Internet gateway and a short message servicing center (SMSC).

7. The method of claim 1, wherein the origination address is one of an e-mail address, IP address, and a wireless phone number.

8. A method for selectively displaying a reply address of a mobile message comprising the steps of:
   determining that a mobile message includes a reply address in a portion of the mobile message commonly associated with the reply address;
   determining that the reply address is not to be displayed on a recipient device; and
   including data in the mobile message to cause the reply address not to be displayed, wherein the reply address is not provided by a prime originator of the mobile message and is derived from a unique identifier assigned to the message by a wireless internet gateway.

9. The method of claim 8, wherein the reply address includes one of an e-mail address, IP address and a wireless phone number.

10. The method of claim 8, further including the step of:
    displaying a reply address provided by a prime originator of the mobile message as part of the text of the mobile message.

11. A wireless device, including:
    means for receiving a mobile message;
    means for storing an origination address associated with the received mobile message, wherein the origination address is not provided by a prime originator of the mobile message and is derived from a unique identifier assigned to the message by a wireless internet gateway;

means for storing a reply address associated with the received mobile message;

means for determining if the origination address and the reply address are to be displayed to a user of the wireless device;

means for displaying the origination address to the user of the wireless device if the determining means determines that the origination address is to be displayed; and means for displaying the reply address if the determining means determines that the reply address is to be displayed.

12. The device of claim 11, wherein the mobile message is a short messaging service message.

13. The device of claim 12, wherein the origination address is included in the Origination Address parameter of the short messaging service message.

14. The device of claim 12, wherein the reply address is included in a Call-back Number subparameter of the short messaging service message.

15. A wireless device, comprising:

means for receiving a mobile message which includes an origination message and privacy data;

means for storing an origination address associated with the received mobile message;

means for determining if the origination address is to be displayed to a user of the wireless device using the privacy data associated with the received mobile message; and means for displaying the origination address to the user of the wireless device if the determining means determines that the origination address is to be displayed, wherein the origination address is not provided by a prime originator of the mobile message and is derived from a unique identifier assigned to the message by a wireless internet gateway.

16. The device of claim 15, wherein the mobile message is a short messaging service message.

17. The device of claim 16, wherein the origination address is included in the Origination Address parameter of the short messaging service message.

18. The device of claim 15, wherein the privacy data is two bits allowing for the definition of four possible values.

19. The device of claim 15, further comprising:

means for storing a reply address associated with the received mobile message;

means for determining if the reply address is to be displayed to a user of the wireless device;

means for displaying the reply address if the determining means determines that the reply address is to be displayed.

20. The device of claim 19, wherein the reply address is included in the Call-back Number subparameter of the short messaging service message.

* * * * *